(12) United States Patent
Frederiksen

(10) Patent No.: US 7,077,031 B1
(45) Date of Patent: Jul. 18, 2006

(54) MULTIPLE LUG NUT REMOVAL TOOL

(76) Inventor: Anthony N. Frederiksen, 856 E. Gardendale Dr., Montgomery, AL (US) 36110

( * ) Notice: Subject to any disclaimer, the term of this patent is extended or adjusted under 35 U.S.C. 154(b) by 0 days.

(21) Appl. No.: 10/972,019

(22) Filed: Oct. 25, 2004

(51) Int. Cl.
*B25B 17/00* (2006.01)

(52) U.S. Cl. .................. 81/57.22; 81/57.32; 81/57.36; 81/177.5

(58) Field of Classification Search ............... 81/57.22, 81/57.36, 57.3, 57.14, 57.29, 57.31, 57.32, 81/177.1, 177.5
See application file for complete search history.

(56) References Cited

U.S. PATENT DOCUMENTS

| 2,781,682 | A | * | 2/1957 | Herndon ..................... 81/57.22 |
| 3,319,494 | A | * | 5/1967 | Ulbing ....................... 81/57.22 |
| 3,805,645 | A | * | 4/1974 | Jenny ......................... 81/57.22 |
| 3,812,744 | A | * | 5/1974 | Westerberg ................ 81/57.36 |
| 3,848,488 | A | * | 11/1974 | Weisenburger ............. 81/57.22 |
| 4,063,475 | A | | 12/1977 | Perkins |
| 4,368,556 | A | * | 1/1983 | Wanner et al. ................ 16/436 |
| 4,820,090 | A | | 4/1989 | Chen |
| 4,909,105 | A | | 3/1990 | Namiki et al. |
| 5,074,170 | A | | 12/1991 | Shirley |
| D337,712 | S | | 7/1993 | Cavedo |
| 5,277,085 | A | | 1/1994 | Tanimura et al. |
| 6,134,989 | A | * | 10/2000 | Stevens ..................... 81/57.22 |
| 6,305,245 | B1 | | 10/2001 | Kress |
| 6,668,685 | B1 | * | 12/2003 | Boston ...................... 81/57.22 |
| 6,918,322 | B1 | * | 7/2005 | Biller ......................... 81/57.22 |
| 2002/0117027 | A1 | | 8/2002 | Boston |

* cited by examiner

*Primary Examiner*—Hadi Shakeri

(57) ABSTRACT

A multiple lug nut removal tool includes an air gun that includes a cylindrical housing having a front end. A cover is mounted over the front end. A drive axle is mounted within the housing. A primary gear is attached to the drive axle. A plurality of secondary axles extends through the cover. Each of the secondary axles has a first end positioned within the housing and a second end extending outwardly away from the cover. Each of a plurality of secondary gears is attached to one of the first ends. The secondary gears are each in communication with the primary gear. Each of a plurality of couplers is attached to one of the secondary axles. Each of a plurality of sockets may be attached to one of the secondary axles by the couplers so that the sockets are rotated when the primary gear is rotated.

2 Claims, 3 Drawing Sheets

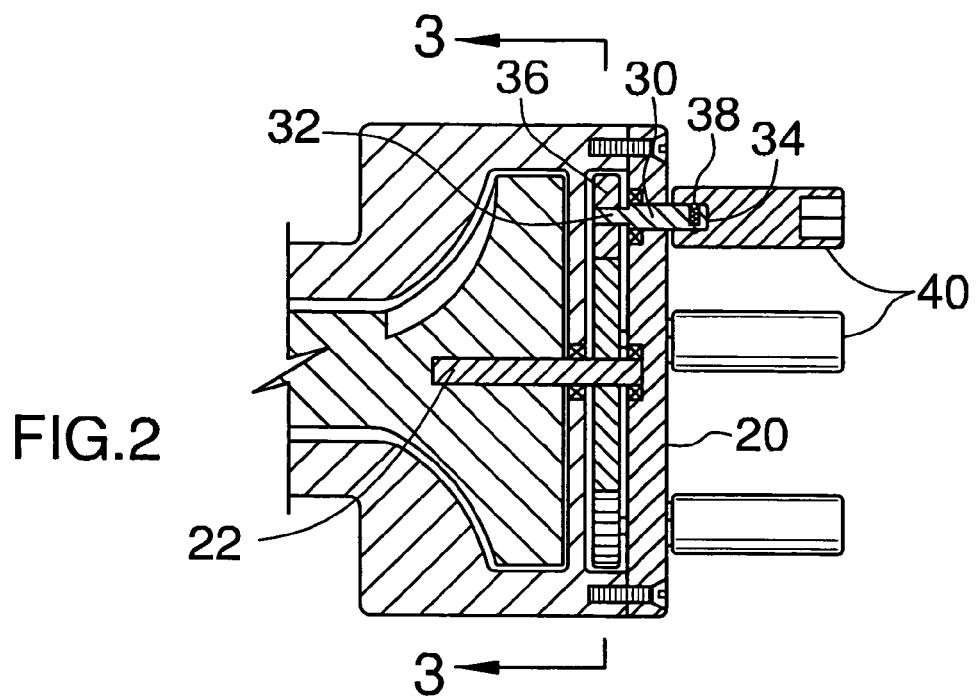
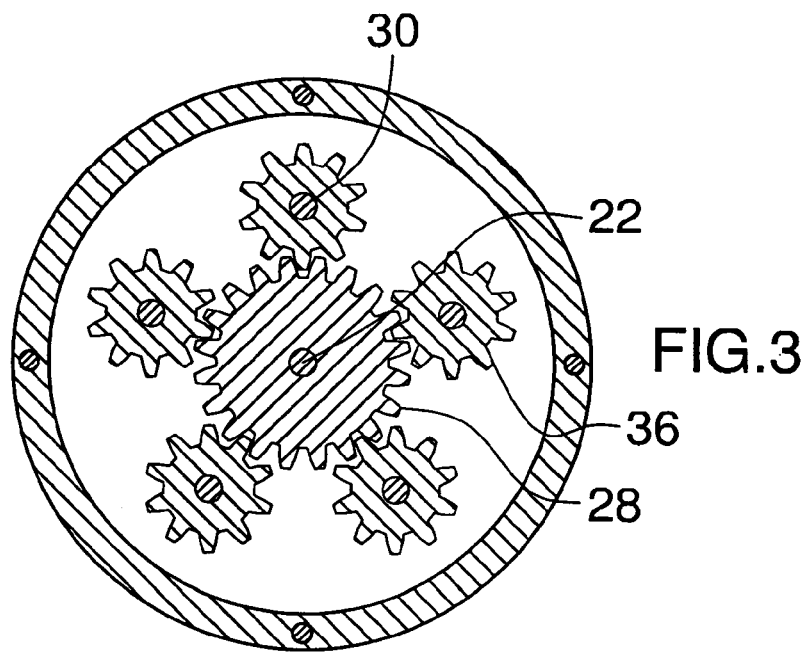

MULTIPLE LUG NUT REMOVAL TOOL

BACKGROUND OF THE INVENTION

1. Field of the Invention

The present invention relates to lug nut removing devices and more particularly pertains to a new lug nut removing device for simultaneously removing a plurality of lug nuts.

2. Description of the Prior Art

The use of lug nut removing devices is known in the prior art. U.S. Pat. No. 6,305,245 describes a gear assembly that may be used for removing multiple lug nuts. Another type of lug nut removing device is U.S. patent app. 2002/0117027 A1 which again described a gear assembly that may be used to remove multiple lug nuts. U.S. Pat. No. 5,074,170 describes an adjustable device for allowing the removal of lug nuts at varying positions with respect to each to each other.

While these devices fulfill their respective, particular objectives and requirements, the need remains for a device which includes couplers and shaft for attaching sockets thereto to facilitate the removal of lug nuts. Additionally, a removable secondary handle would aid a person in removing lug nuts to gain the proper leverage that would be required while removing simultaneously removing a plurality of lug nuts.

SUMMARY OF THE INVENTION

To this end, the present invention generally comprises an air gun that includes a cylindrical housing having a front end. A cover is mounted over the front end. A drive axle is mounted within the housing and is rotated when air flows through the air gun. A primary gear is attached to the drive axle and is positioned within the housing adjacent to the cover. A plurality of secondary axles extends through and is rotatably coupled to the cover. Each of the secondary axles has a first end positioned within the housing and a second end extending outwardly away from the cover. Each of a plurality of secondary gears is attached to one of the first ends of the secondary axles. The secondary gears are each in communication with the primary gear so that each of the secondary gears rotates when the primary gear is rotated. Each of a plurality of couplers is attached to one of the secondary axles and is adapted for releasably engaging a socket to an associated one of the secondary axles. Each of a plurality of sockets may be attached to one of the secondary axles so that the sockets are rotated when the primary gear is rotated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross-sectional view taken along line 2—2 of FIG. 1 of the present invention.

FIG. 3 is a cross-sectional view taken along line 3—3 of FIG. 2 of the present invention.

DESCRIPTION OF THE PREFERRED EMBODIMENT

Figure 1:
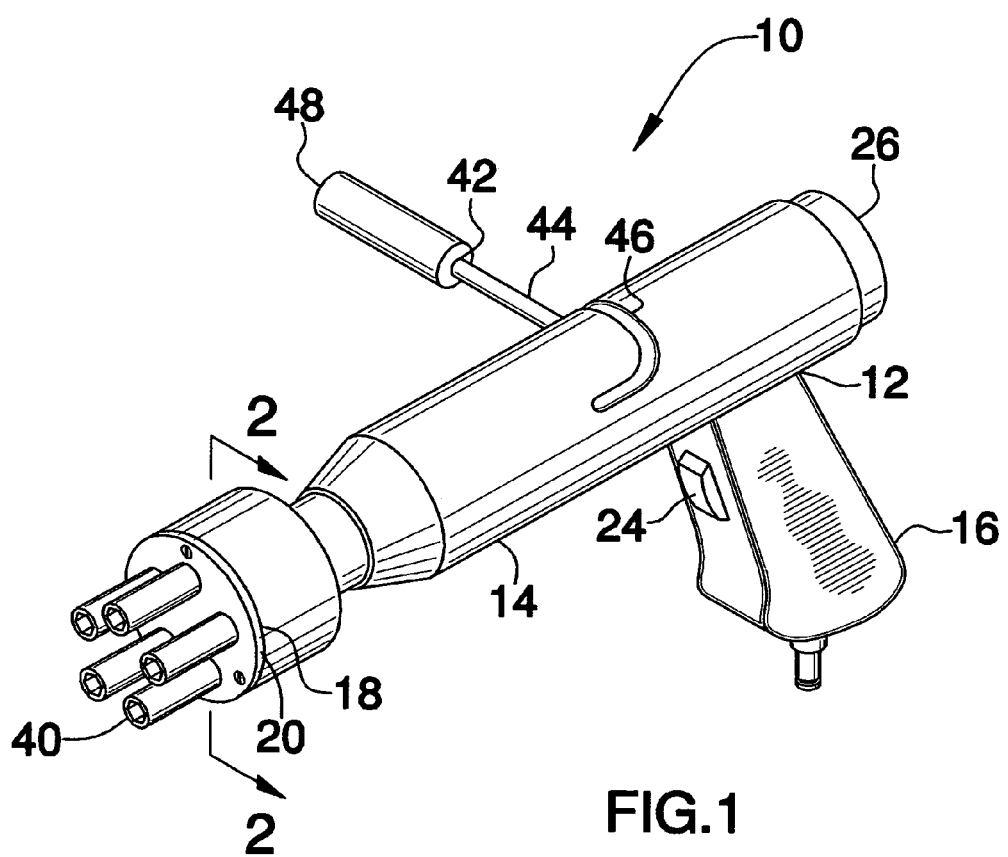
FIG. 1 is a perspective view of a multiple lug nut removal tool according to the present invention.
Figure 4:
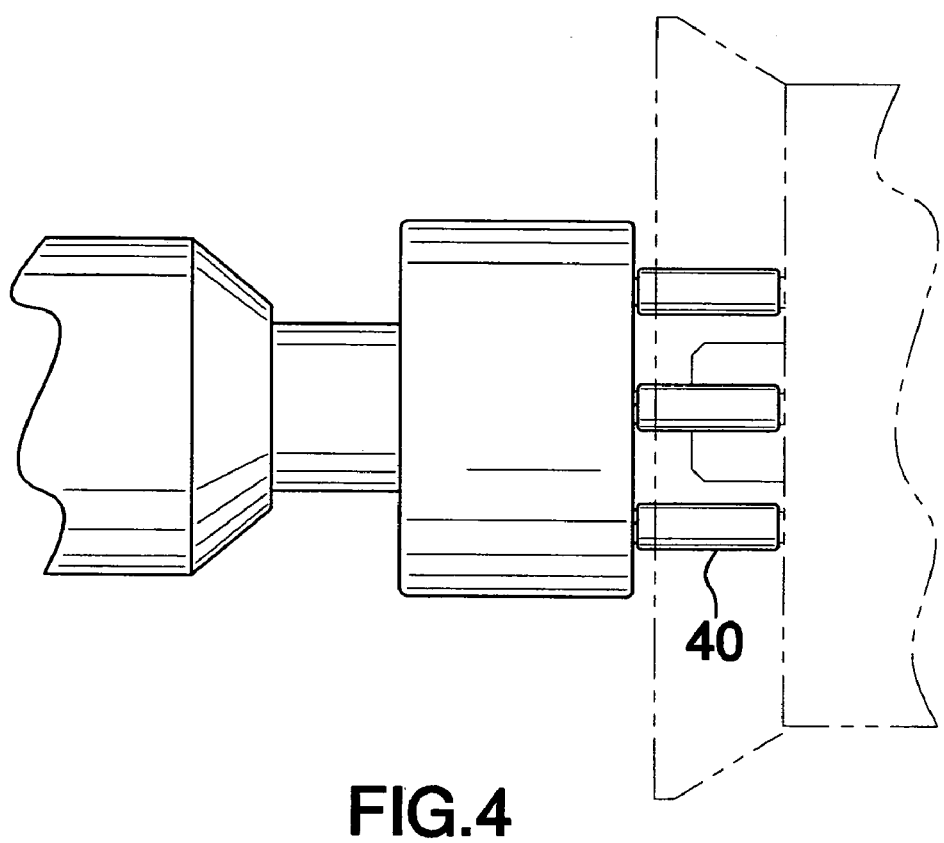
FIG. 4 is a side view of the present invention.

With reference now to the drawings, and in particular to FIGS. 1 through 4 thereof, a new lug nut removing device embodying the principles and concepts of the present invention and generally designated by the reference numeral 10 will be described.

As best illustrated in FIGS. 1 through 4, the multiple lug nut removal tool 10 generally comprises an air gun 12 that includes a cylindrical housing 14 and a handle 16 that is attached to and extends downwardly from the housing 14. The cylindrical housing 14 has a front end 18. A cover 20 is mounted over the front end 18. A drive axle 22 is mounted within the housing 14. The primary axle 22 is rotated when the air flows through the air gun 12. The air gun 12 includes an actuator switch 24 for allowing an air supply fluidly coupled to the air gun 12 to rotate an impeller, which in turn rotates the drive axle 22. A switch 26 is also mechanically coupled to the drive axle 22 for selectively determining a direction of rotation of the drive axle 22.

A primary gear 28 is attached to the drive axle 22. The primary gear 28 is positioned within the housing 14 and is positioned adjacent to the cover 20. A plurality of secondary axles 30 extends through and is rotatably coupled to the cover 20. Each of the secondary axles 30 has a first end 32 positioned within the housing 14 and a second end 34 extending outwardly away from the cover 20. The secondary axles 30 are each equidistant from an axis of the primary gear 28. Each of plurality of secondary gears 36 is attached to one of the first ends 30 of the secondary axles 30. Each of the secondary gears 36 is in communication with the primary gear 28 so that each of the secondary gears 36 rotates when the primary gear 28 is rotated. It is preferred that there are five secondary gears 36.

Each of a plurality of couplers 38 is attached to one of the secondary axles 30 and is adapted for releasably engaging a socket 40 to an associated one of the secondary axles 30. The couplers 38 are preferably ball detents positioned on the secondary axles 30 and are positioned adjacent to the second ends 34. Conventional sockets 40 employ a depression for receiving the ball detent. The secondary axles 30 also preferably have a square shaped cross-section taken perpendicular to their longitudinal axis.

A gripping member 42 is removably attachable to the housing 14. The gripping member 42 extends laterally away from the housing 14. The gripping member 42 preferably includes and elongated rod 44 having a bend therein adapted for fitting into a similarly shaped track 46 that is depressed into the housing 14. A handle 48 is attached to one of the ends of the rod 44 and extends outwardly away from the housing 14 when the rod 44 is in the track 46. The rod 44 may be removed from the track 46 when the gripping member 42 is not required and for storage purposes.

In use, each of a plurality of sockets 40 may be attached to one of the secondary axles 30 so that the sockets 40 are simultaneously rotated when the primary gear 28 is rotated. The secondary axles 30 are to be positioned so that each corresponds to one lug nut one a tire and thus different versions of the tool 10 will be adapted for fitting different lug nut locations. When a central area of the cap 20 is aligned with the hub of a tire, each of the sockets 40 is allowed to engage one of the lug nuts of the tire and each may be selectively loosened or tightened accordingly.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lug nut removal assembly for simultaneously removing a plurality of lug nuts, said assembly including:
    an air gun including a cylindrical housings said cylindrical housing having a front end, a cover being mounted over said from end, a drive axle being mounted within said housing, said axle being rotated when said air flows through said air gun;
    a primary gear being attached to said drive axle, said primary gear being positioned within said housing and being positioned adjacent to said cover;
    a plurality of secondary axles extending through and being rotatably coupled to said cover, each of said secondly axles having a first end positioned within said housing and a second end extending outwardly away from said cover, said secondary axles each being equidistant from an axis of said primary gear;
    a plurality of secondary gears, each of said secondary gears being attached to one of said first ends of said secondary axles, each of said secondary gears being in communication with said primary gear such that each of said secondary gears rotates when said primary gear is rotated;
    a plurality of couplers, each of said couplers being attached to one of said secondary axles and being adapted for releasably engaging a socket to an associated one of said secondary axles;
    a first handle being attached to and extending downwardly from said housing;
    a gripping member bring removably attachable to said housing, said gripping member extending laterally away from said housing, said gripping member including an elongated rod having a bend therein adapted for fitting into a similarly shaped track depressed into said housing, said track being formed on an upper convex portion of the housing and further extending longitudinally towards said cover on one side, a second handle being attached lo an end of said rod, said second handle extending outwardly away from said housing when said rod is engaged with said track; and
    wherein each of a plurality of sockets may be attached to one of said secondary axles such that said sockets are rotated when said primary gear is rotated.

2. The assembly according to claim 1, wherein said plurality of secondary axles includes five secondary axles.

* * * * *